(12) United States Patent
Hermes

(10) Patent No.: US 8,776,175 B1
(45) Date of Patent: Jul. 8, 2014

(54) METHOD AND SYSTEM FOR MANAGING GLOBAL NETWORK ACCESS

(76) Inventor: Jihad Hermes, Herndon, VA (US)

(*) Notice: Subject to any disclaimer, the term of this patent is extended or adjusted under 35 U.S.C. 154(b) by 2053 days.

(21) Appl. No.: 11/410,928

(22) Filed: Apr. 26, 2006

(51) Int. Cl.
*G06F 7/04* (2006.01)

(52) U.S. Cl.
USPC ................................................. 726/3; 726/27

(58) Field of Classification Search
None
See application file for complete search history.

(56) References Cited

U.S. PATENT DOCUMENTS

| | | | |
|---|---|---|---|
| 5,774,869 A | 6/1998 | Toader | |
| 6,442,529 B1 | 8/2002 | Krishan et al. | |
| 6,712,702 B2 | 3/2004 | Goldberg et al. | |
| 6,788,771 B2 | 9/2004 | Manto | |
| 6,823,385 B2* | 11/2004 | McKinnon et al. | 709/226 |
| 6,976,163 B1 | 12/2005 | Hind et al. | |
| 7,512,987 B2* | 3/2009 | Williams | 726/27 |
| 7,856,659 B2* | 12/2010 | Keeler et al. | 726/7 |
| 2002/0023003 A1 | 2/2002 | Raheman | |
| 2002/0087335 A1 | 7/2002 | Meyers et al. | |
| 2004/0210771 A1* | 10/2004 | Wood et al. | 713/201 |
| 2005/0148377 A1 | 7/2005 | Goldberg et al. | |

* cited by examiner

*Primary Examiner* — Kaveh Abrishamkar
(74) *Attorney, Agent, or Firm* — Birch, Stewart, Kolasch & Birch, LLP.

(57) ABSTRACT

An access management system provides tiered access to a global communications network. A default level of access to the global communications network, for example the Internet, is provided free for all users with a compatible communications device, and at least one subscription level of service is provided to users for a fee. Access to the communications network is monitored and restricted based on user content and resource privileges.

8 Claims, 5 Drawing Sheets

METHOD AND SYSTEM FOR MANAGING GLOBAL NETWORK ACCESS

BACKGROUND OF THE INVENTION

The invention relates generally to a method and system for providing access to a global communications network, and more specifically, to a method and system for managing tiered access to a global communications network, such as the Internet.

A conventional model for providing access to the Internet consists of Internet Access Providers (IAP) or Internet Service Providers (ISP) providing subscription based access to subscribers/users. It should be noted that while there is a distinction between an ISP and IAP, the distinction between the two is not germane for the invention and therefore are herein considered to be interchangeable with regard to the invention.

As illustrated in FIG. 1, users access an ISP's network via an access device 100. The access device may be any device compatible with the ISP's network communications protocol, for example, a cable modem, a DSL modem, a mobile telephone, a wireless network card, and the like. Once the user has logged on to their respective ISP, (i.e., a connection is establish between an access device 100 and an ISP network 101) and their identity has been verified, the user is provided access to the Internet through a web of interconnected ISP networks 103 using a process referred to as peering.

Generally, once a user has subscribed with a particular ISP, the user is provided unlimited access to the Internet. In other words, each subscriber receives the same access to the Internet based on the particular subscription/rate the user pays. It should be noted that some limitations may be placed on the access via user preference, such as parental controls and the like.

According to this conventional model, individual subscribers pay for the cost of providing access to the Internet and ultimately to the content contained on the Internet, referred to as the world wide web. However, this access model does not allow e-businesses to sponsor the cost of Internet access in order to generate increased traffic to their web portals. As a result other access models have been developed or suggested which allow for advertising revenue to sponsor user access to the Internet.

Generally, these advertising based models provide a user with free or subsidized Internet access in exchange for individual user marketing information and display space on their respective access devices. Typically, a user signs up with an ISP who offers free access in return for the use providing the ISP with consumer marketing information. This marketing information is then collected and processed to provide targeted advertising to the user in the form of pop-up windows for reserved display space while the user is accessing the Internet. However, under these advertising based models, like the previously discussed models, each user is provided the same unlimited or bandwidth limited access to the Internet. Therefore, once a user has provided their initial marketing information there is little or no incentive for the user to upgrade their access or purchase value-added services.

Accordingly, the conventional access models discussed above do not provide tiered access which allows both sponsor supported and subscription based access.

SUMMARY OF THE INVENTION

The invention overcomes the drawbacks of conventional global network access models by providing an access management method and system that provides both content sponsored access and subscription based access to a global network.

Accordingly to an embodiment of the invention, the access management system provides a default level of access to all users and at least one subscription level of access.

BRIEF DESCRIPTION OF THE DRAWINGS

Further aspects and advantages of the present invention will become apparent upon reading the following detailed description taken in conjunction with the accompanying drawings, in which.

DETAILED DESCRIPTION

Embodiments consistent with the present invention are more specifically set forth in the following description with reference to the appended figures. Although the detailed embodiments described below relate to providing access to the Internet, principles of the present invention described herein may also be applied to providing tiered access to any communications network.

The invention provides a method and system for providing access to a global communications network, such as the World Wide Web (herein "Internet"). More specifically, the invention provides tiered access to the Internet that is both content provider sponsored and subscription based.

Figure 1:
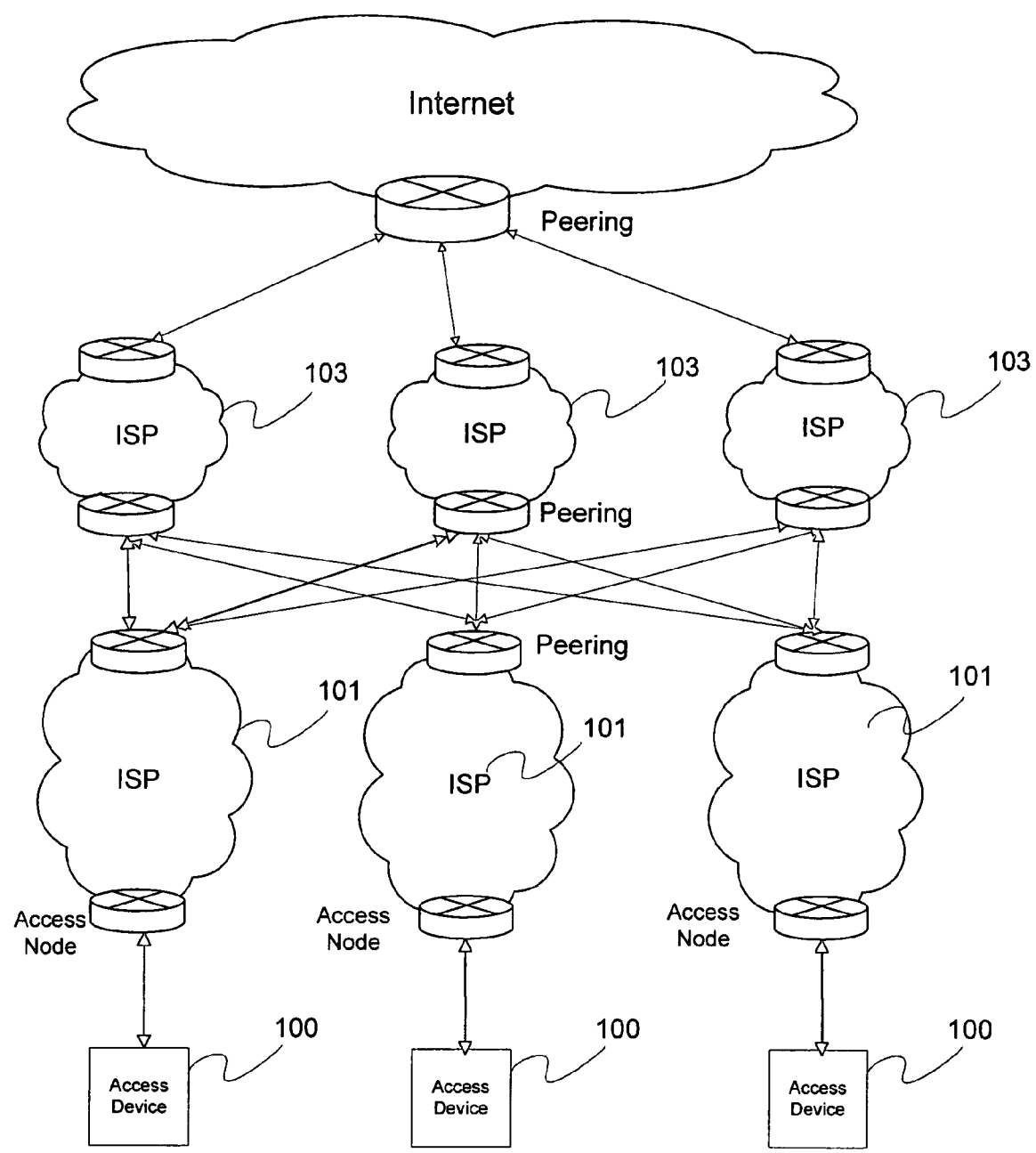
FIG. 1 is a schematic view of a conventional system for providing Internet access.
Figure 2:
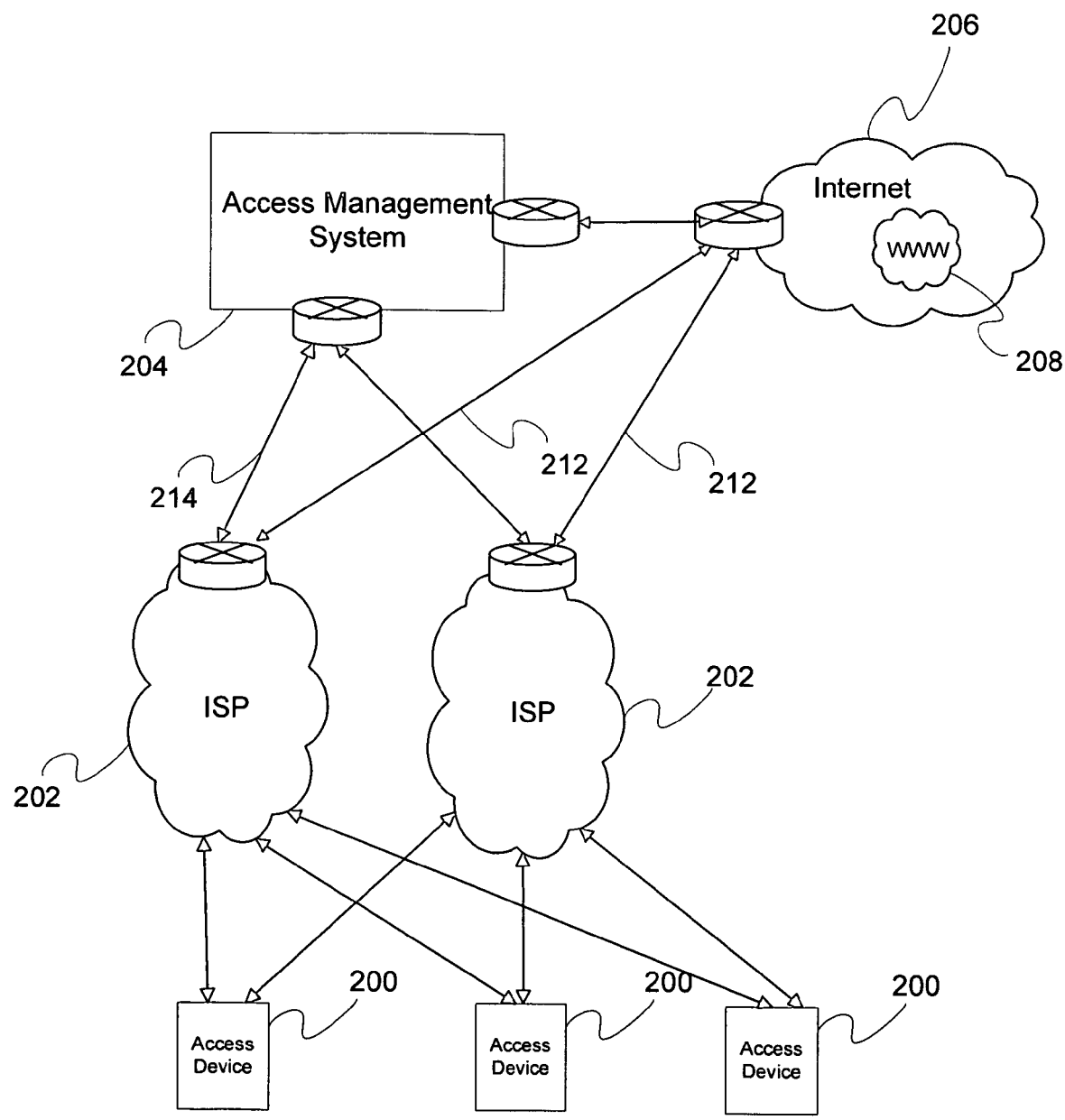
FIG. 2 is a schematic view of an access model according to an embodiment of the invention.

FIG. 2 illustrates an access model according to an embodiment of the invention. As illustrated, user access to a global communications network 200, for example the Internet, is provided through a communication link routed from an access device 200, through one of a plurality of ISP networks 202, then directly to the global communications network or indirectly through the access management system (AMS) 204. For the purposes of the invention, the global communications network illustrated is the Internet. However, one skilled in the art would appreciate that the invention may be applied to any global communications network.

Any access device 200 compatible with a respective ISP's network protocols may be used to initiate/establish access to the Internet. For example, communications may be established between an access device and an ISP network via a cable modem, a DSL modem, a wireless network interface, an Ethernet card, and the like. The access management system 204 provides tiered access to the Internet based on predefined access privileges which are discussed in more detailed infra.

The access model as shown in FIG. 2 provides a system for centralized management of access to a global communications network for some or all users for a given ISP. For example, a cable ISP can utilize the invention to offer limited Internet access managed by the AMS (through communication link 214 in FIG. 2) while maintaining control over premium based subscriptions (though communication link 212 in FIG. 2). In FIG. 2 the access management system 204 is illustrated as a separate entity to the ISPs 202 for illustrative purposes only. One skilled in the art would readily appreciate that the functionality provided by the AMS may be implemented individually within each participating ISP, or may be spread globally through a network of interconnected ISPs.

Access Management System

Figure 3:
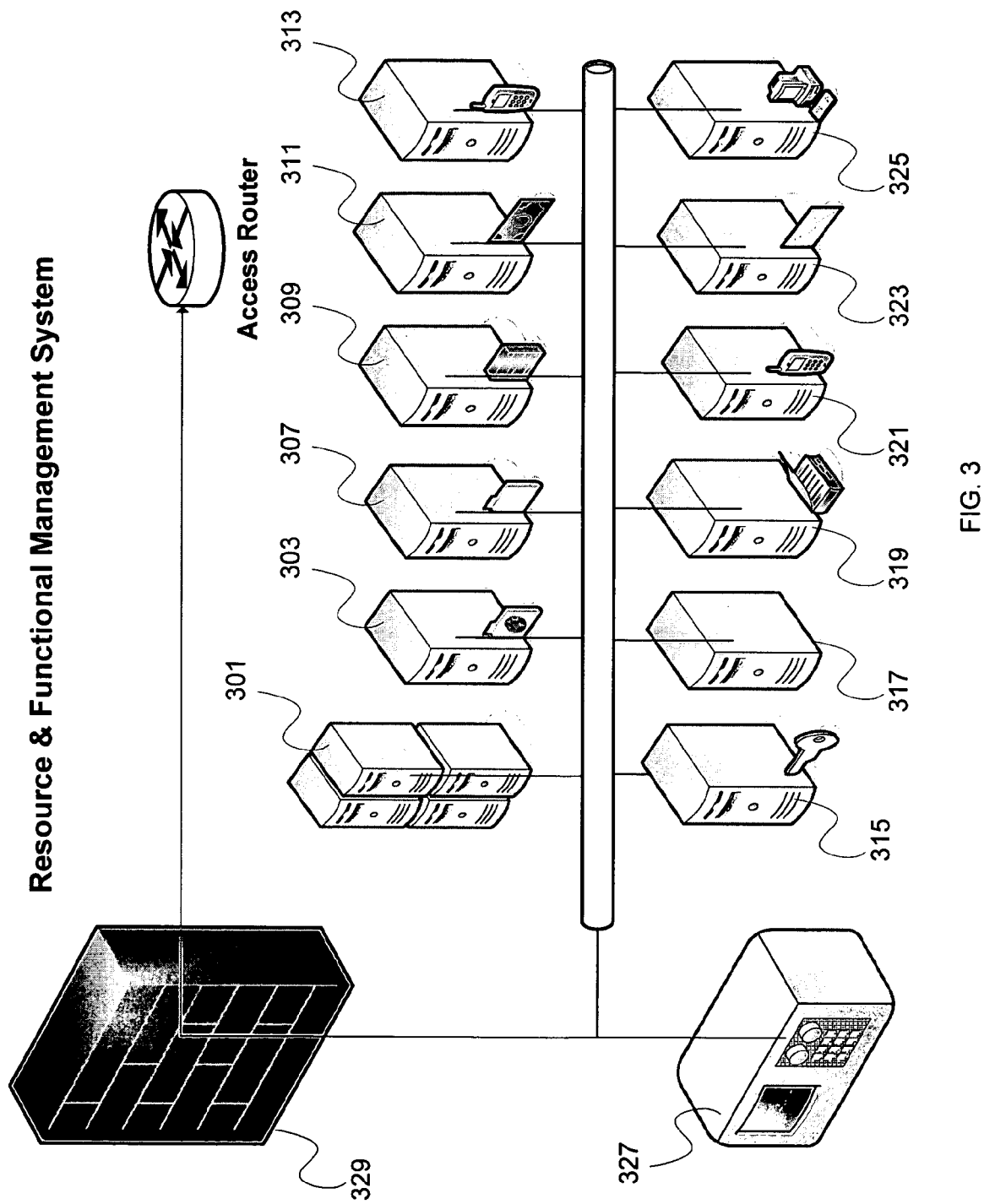
FIG. 3 is a functional diagram of the access management system according to an embodiment of the invention.

FIG. 3 illustrates a functional diagram of an access management system according an embodiment of the invention. Again, the grouping of the various servers/hardware in FIG. 3 is merely for illustrative purposes and should not be interpreted to limit the implementation of the present invention in any manner. The access management system manages, for example, bandwidth, grade/quality of service (QoS), ancillary network resources, use restrictions and user privileges to offer tiered Internet access to users/subscribers.

The access management system may employ a combination of software, hardware, and/or configuration systems to manage resource and content privileges. For example, resource management may be controlled through the use of various hardware components, such as firewalls 329, radio access configuration 327, multi-protocol label switching (MPLS), routers, and the like. Content management may be controlled through the use of various severs 301-325 running custom and off the shelf software to provide various functionality such as portals, browsers, insertion, redirection, substitution, filtering, and the like. Accordingly, for brevity and clarity these components are not discussed in detail herein as one skilled in the art could readily determine from the specified functionality the hardware and software components required to implement the present invention.

The access management system provides at least two tiers or levels of service: 1) a default level of resource and content restricted access available to all users at no cost to the user; and 2) at least one registered level that is defined by access privileges based on user subscription type. A registered or subscribed level/tier requires the user to register with the system and pay specified fees for the added privileges.

According to an exemplary embodiment the access tiers may be defined as follows:

a. Default Access: Always-on access portal for sign-in and registration. Portal may include free basic resource and content privileges that do not require user subscription.

b. Tier 1: Registered users with free but limited Internet access privileges and personalization. These users may be able to establish accounts with a variety of funding sources and earned credits for the purpose of "ala carte" services.

c. Tier 2: Registered users with Tier 1 privileges plus opportunity to purchase bundled functionality, vended functionality, predefined walled gardens and/or sponsored access privileges.

d. Tier 3: Subscription users with basic resource and content privileges. Permits typical unlimited internet usage.

e. Tier 4: Premium subscription users with expanded resource privileges, for power users with demanding needs.

f. Tier 5: Highest level subscription access and QoS for business/mission critical access, priority service and no content privilege restrictions.

Access privileges available to a specific level/tier of service may be based on resource, content, and personalization privileges. Resource privileges include the ability to differentiate quality of service, for example, availability, bandwidth, security, prioritization, delays, server resources, and the like. Content privileges provide the ability to differentiate functionality such as graphics, file, and media restrictions, for example, fidelity/resolution, transfer size, file types, encryption, Java and ActiveX, link behavior, and the like. Content privileges may also includes general purpose and/or targeted portals, multimedia services, domains, gaming, redirection, insertion, substitution, sponsored domains, vending access, virtual private networks (VPNs), and/or features such as news, gaming, utilities, trade, services, freebees, Internet communities, instant messages (IMs), blogs, interactive sessions, time killers, virus/spyware protection, and the like. Personalization privileges may include providing personal space, customized portals, hosting, domain, email, messaging, alerts, internet agents, account information, coupons, redeemable passes, earned points, classifieds, internet communities and affiliations, and the like.

System Access

User access to the access management system is via a portal through any available internet connection and can be ISP and/or device independent. In other words, the access management system provides a fully portable subscription. For example, the same portal and minimum privileges can be accessed from home, hot spots on the road, work, or travel so long as the ISP is a cooperating member.

In addition, the access management system may provide content management subscription which are independent of the access point a user utilizes. For example, a user may subscribe to the system in order to receive email, host their own content, and/or personalize the information they are to receive from other content provides. Under this content subscription, the use will have access to their personal portal regardless of what means they use to access the Internet.

Figure 4:
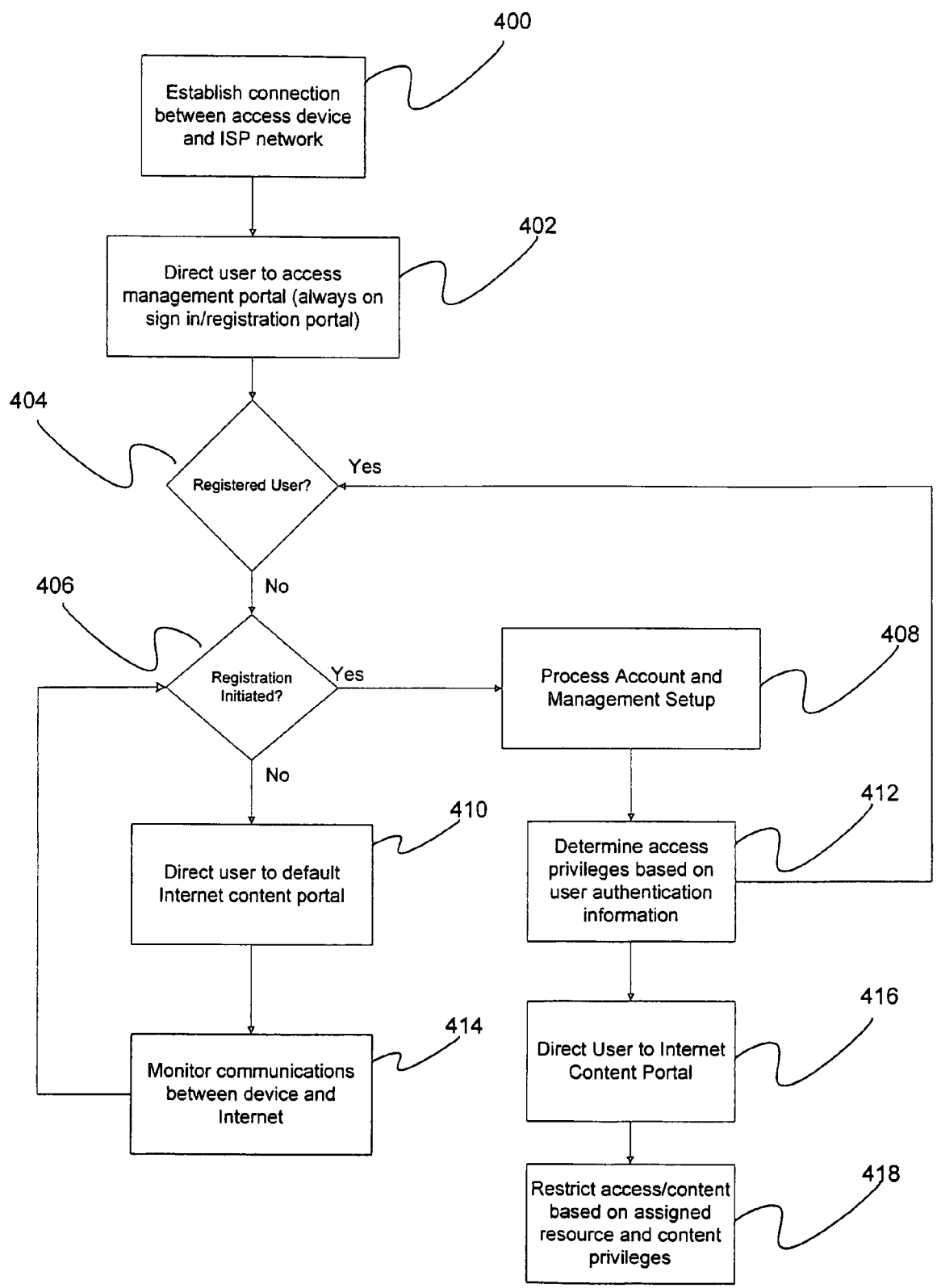
FIG. 4 is a flowchart of an access model according to an embodiment of the invention.

FIG. 4 is a flow chart illustrating general access management. Initially, at step 400, a user establishes a connection between an ISP network and any compatible access device, for example, a dial up modem, cable modem, Ethernet adapter, DSL modem, wireless modem, WiFi, WiMax, Cellular, Wireless Hub, and the like. Then the user is directed to an access management system portal at step 402. It is then determined whether or not the user is a registered user at step 404. If the user is not a registered user (NO path out of Step 404) the system determines whether or not the user wishes to initiate the registration process at step 406. If the user wishes to register, they are directed through the account and management set-up process (YES path out of step 406). Upon completion of the account set-up, the user's access privileges are determined based on the registration information provided at step 412. The user is then provide limited Internet access based on the assigned access privileges at steps 416 and 418.

If the user is not a registered user (NO path out of step 404) and does not wish to initiate registration (NO path out of step 406) the user is provided limited Internet access based on default access privileges at step 410. Communications between the user and the Internet are monitored to provide the default restricted access and generate potential new sponsorships based on user traffic at step 414.

If the user is a registered user (YES path out of step 404) then the user's access privileges are determined at step 412. Then the user is provided access to the Internet within the limits of their subscribed to level or tier of service as discussed in greater detail below with regard to FIG. 5.

Resource Privileges

Resource privileges may be managed through a variety of techniques, for example, network settings to limit bandwidth, delays, and prioritization. In addition, the access management system may employ file size limits, file transfer delays, image resolution and media quality restrictions in order to differentiate resource privileges. The net effect is that utilization of the ISP's resources are minimized and the user is given an incentive to upgrade if higher quality of service is required/desired. The higher the tier, the more resource privileges made available to the user.

Content Privileges

Content privileges may be managed through a variety of techniques/systems including, for example, firewalls, walled gardens, link and image disabling, redirection to cooperating matches, insertion and substitution techniques. An example is that a default search portal is presented whenever a search portal is invoked.

Usage pattern accounting system would keep track of traffic patterns and apply rules for fees and access restrictions. An example would be a monitoring of domain access usage for an online retailer, if sufficient traffic has originated from free users, the retailer may be restricted pending a commercial arrangement.

The access management system comprehensively monitors and tracks user web access to entities that depend on such accesses. When a threshold amount of traffic to a particular content provider is reached, the content provider may be asked to sponsor the usage or be subject to content access restrictions. An example would be that user access to Monster.com can result in user restrictions such as blocking or redirection to CareerBuilder.com if Monster.com does not sponsor usage.

Default level (i.e. "free") users are provided with access to sufficient content to maximize their use of intra-portal content to improve customer loyalty and reduce network resource requirements. For example, weather, news, games, time killers and the like would be available to create and maintain a relationship with the user to improve loyalty and resource consumption.

Figure 5:
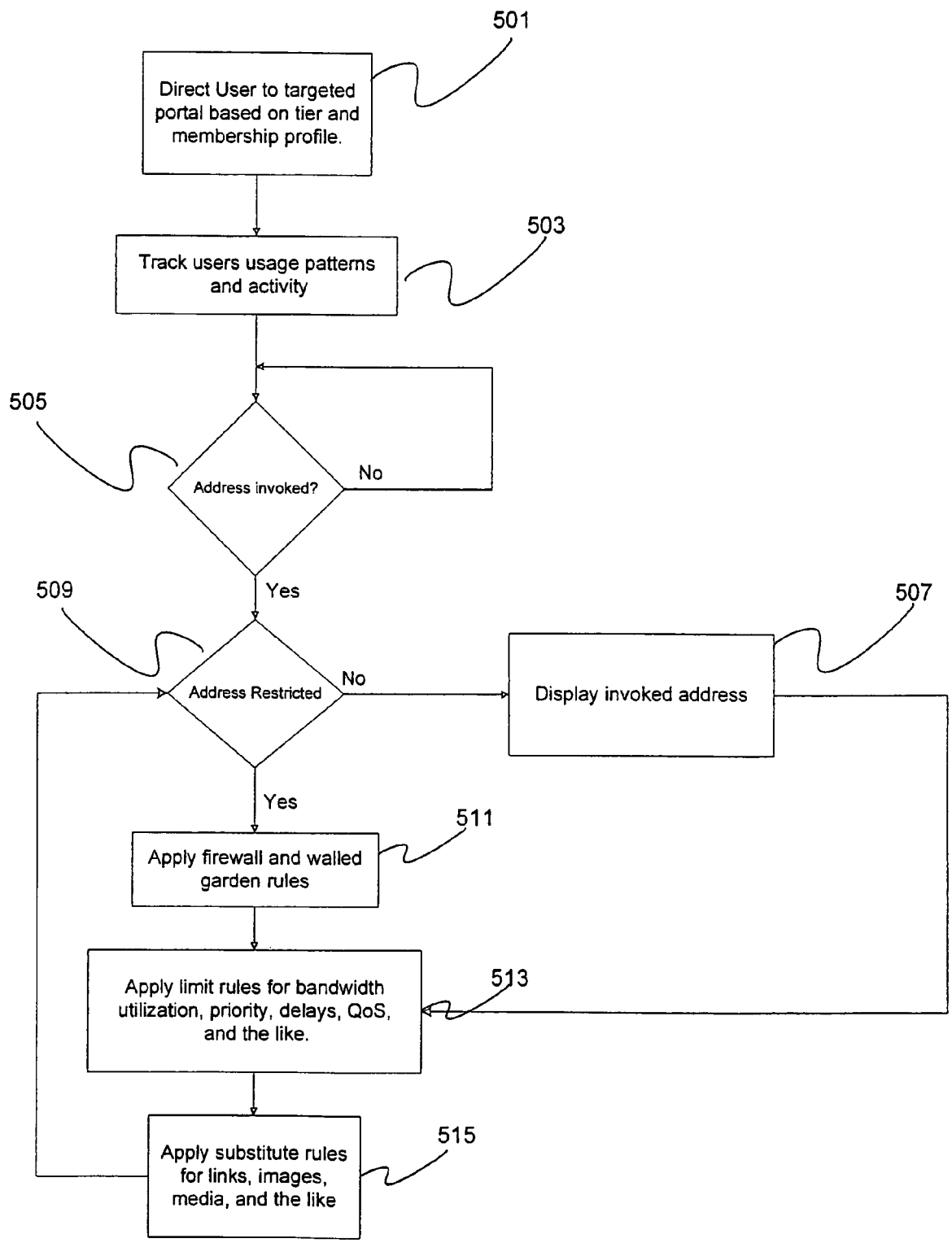
FIG. 5 is a flowchart of resource and content management according to an embodiment of the invention.

FIG. 5 is a flowchart illustrating resource and content privileges according to an embodiment of the invention. At step 500 a user is directed to a targeted portal based on their associated access tier and membership profile or a default portal if unregistered "freebie" user. From the user's prospective they enjoy access based on specific resource and content privileges while their usage pattern and activity are tracked by the access management system at step 503. When the user invokes a web address, the access management system determines whether or not the address is associated with a restricted destination at steps 505 and 509. If the destination is a restricted destination (YES path out of step 509), the user is denied access to the invoked address. This may be achieved by redirecting to the user to a sponsor who provides related content or by simply providing the user with an indication that the destination is not supported under their current tier at steps 511 through 515. This provides the user with a possible incentive to upgrade their service subscription. It also promotes content providers to pay for the user's access in order to have their content provided as an alternative to a competitor's content.

If the destination is not restricted the user is direct to the invoked address (NO path out of step 509), and the access management system applies any resource limitations that may apply at step 513. These rules may include resource management such as restrictions on bandwidth, utilization, priority, QoS, and the like. In addition, individual content from an invoked address may be restriction at step 515. For example, embedded links may be disabled, file or media downloads may disabled, and the like. This monitoring continues until the user terminates the session.

The access management system may provide a plurality of content portals to attract users and content providers to participate in the system. For example, content portals may be provided for common-interests, such as news, weather, games and the like.

Personalization

The access management system allows registered to users to personalize there access. Accordingly, users are able to use a default level and are encouraged to become registered users for enhanced privileges to improve user loyalty. An example would be that a registered user can have an e-mail account, personal space, expanded privileges, and the like.

Third party or content provider sponsored access is provided by recovering the cost of the free default access level from content providers who wish to un-restrict user access to their domains or services. The recovered revenue may be established through a variety of fee methods, for example, flat fee, per-click, hits, duration, and the like. For example, a music provider can sponsor user access cost to facilitate music downloads and pay based on per incident use.

Users can also purchase access on vending or ala cart bases such as domain bundles, duration based access, file transfer, etc. For example, a free user can purchase a premium level service for 1 day.

Points system similar to frequent flyer or credit cards may apply, whereby the user accumulates points. An example would be a marketing survey completed by the user can earn points that can be applied towards the purchase of music, upgrades or other merchandise.

User accounts of cash, coupons and/or points can be established for purchasing can be funded directly, by gift cards, third party sponsorship, points earned or credit line. For example, account can be linked to a PayPal account to facilitate commercial transactions.

The access management system generates revenue by charging third parties (i.e., content providers) who wish to have un-restricted user access to their domains or services. The revenue may be determined through a variety of fee methods, for example, flat fees, per-click, number of hits, durations, and the like.

Usage pattern accounting systems keep track of traffic patterns and apply rules for fees and access restrictions. For example, the system monitors access/usage of a particular domain of an online retailer, and if sufficient traffic is originated from free users the retailer's domain would be restricted pending a commercial arrangement.

Although detailed embodiments and implementations of the present invention have been described above, it should be apparent that various modifications are possible without departing from the spirit and scope of the present invention.

What is claimed:

1. A method of providing access to a global communications network, comprising:
   providing access to a network authentication portal to any network compatible access device;
   providing connected devices tiered access to the global communications network, the tiered access including a default level of resource and content restricted access available to connected devices at no cost and at least one registered level that is defined by access privileges based on user subscription type;
   monitoring activity of the connected devices;
   restricting a connected device's access to content available on the global communications network based on the monitored activity and the resource and content privileges granted to the connected device, wherein restricting a connected device's access to content includes redirecting the connected device from a requested content provider to a sponsor content provider.

2. The method of claim 1, wherein the global communications network is the Internet.

3. The method of claim 1, wherein monitoring communications between the connected devices and the global communications network comprises:

determining a number of connected devices that access a particular content provider.

4. A method of providing tiered access to a global communications network through an access management system, comprising:

providing a default level of resource and content restricted access to the global communications network to all users at no cost and at least one registered level that is defined by access privileges based on user subscription type;

monitoring activity of connected users; and determining whether or not to restrict access to specific content providers based on the monitored activity;

wherein access to specific content providers are restricted once a predetermined level of traffic has been initiated unless the content provider establishes a business arrangement with the access management system.

5. The method of claim 4, wherein restricting access to a specific content provider comprises:

redirecting a user to an alternative content provider whenever a restricted content provider is invoked.

6. The method of claim 4, wherein restricting access to a specific content provider comprises:

display a message to a user that an invoked content provider is restricted.

7. The method of claim 4, the business arrangement is a revenue generating method based one of flat fee, per-click, number of hits, and duration.

8. The method of claim 4, further comprising:

providing at least one additional level of access to the global communications network based on a user subscriptions.

* * * * *